Aug. 12, 1952     H. C. SCANLON     2,606,978
CABLE REEL
Filed April 19, 1950     3 Sheets-Sheet 2
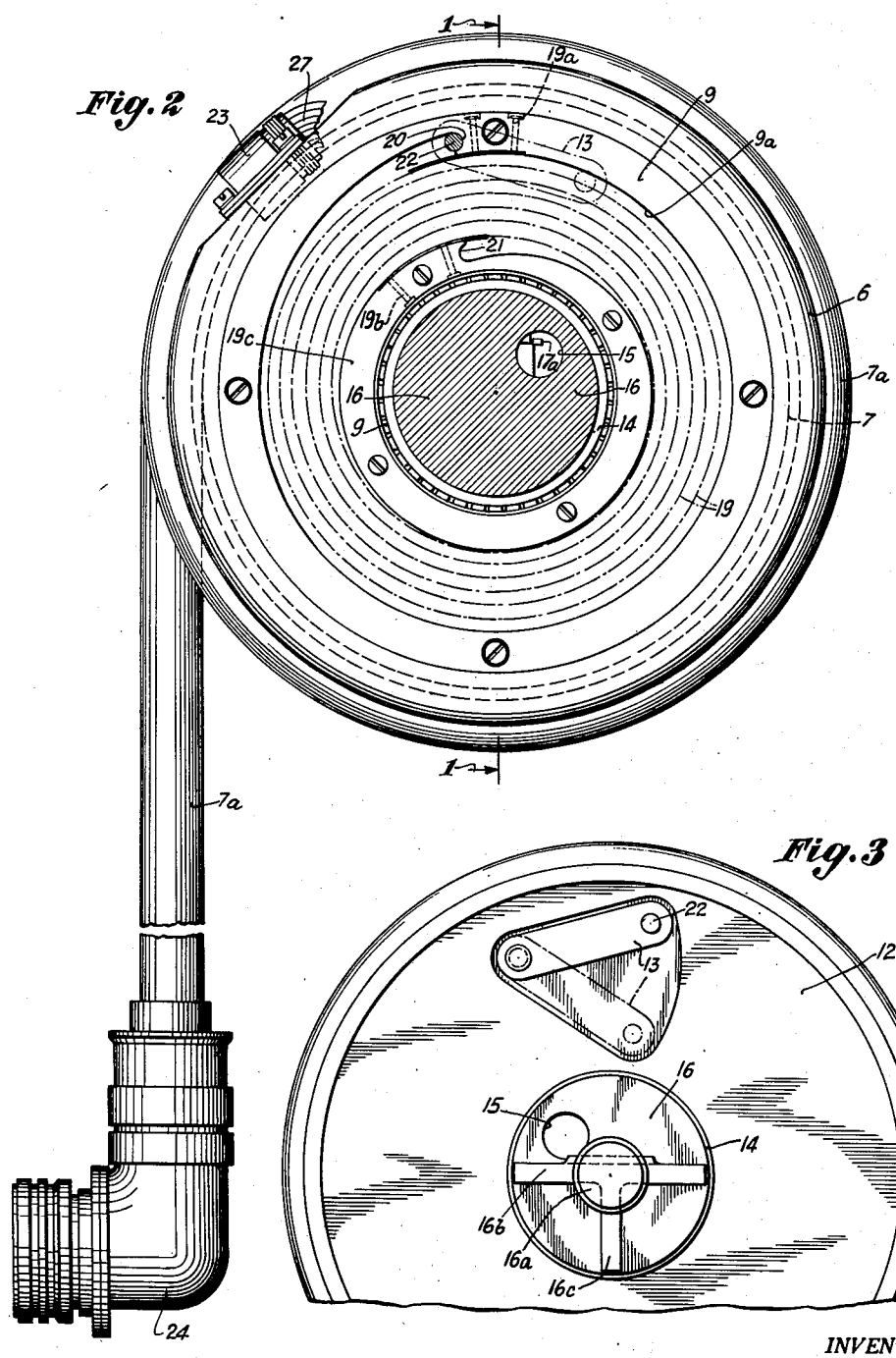
INVENTOR.
Harry C. Scanlon,
BY
Edward L. Mueller
ATTORNEY.

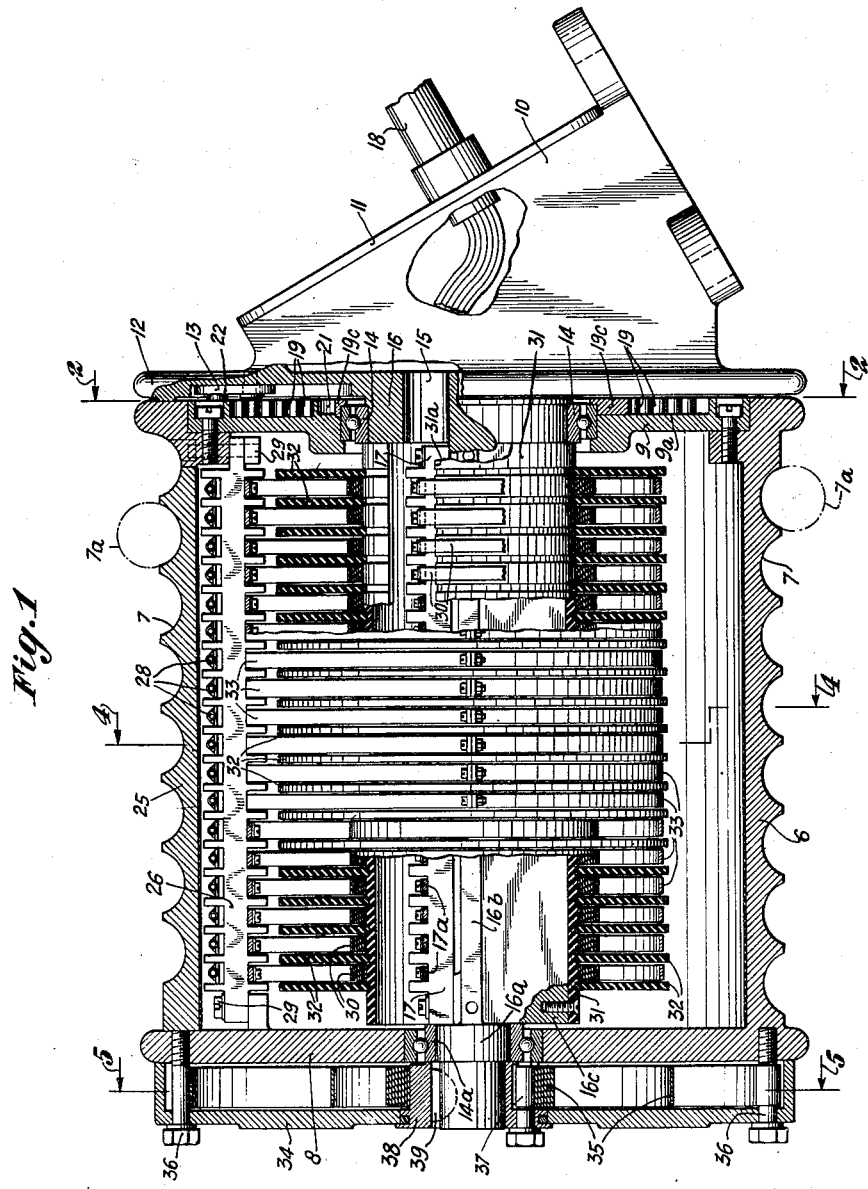

Aug. 12, 1952    H. C. SCANLON    2,606,978
CABLE REEL
Filed April 19, 1950    3 Sheets-Sheet 3

INVENTOR.
Harry C. Scanlon,
BY
Edward L. Mueller
ATTORNEY.

Patented Aug. 12, 1952

2,606,978

UNITED STATES PATENT OFFICE 2,606,978

CABLE REEL

Harry C. Scanlon, Hempstead, N. Y., assignor to Control Instrument Company, Inc., Brooklyn, N. Y., a corporation of New York Application April 19, 1950, Serial No. 156,879

2 Claims. (Cl. 191—12.2)

This invention relates to improvements in winding and reeling apparatus and has particular reference to a cable reel utilized for establishing electrical connections.

Heretofore devices of this nature have been provided wherein freedom of operation of the cable while maintaining electrical connections is accomplished either by the use of brushes and slip rings or by flexible connections. In the former instance, the brushes and rings are subject to oxidation, pitting and corrosion that may result in the introduction of noise into those circuits in which they are interposed, while in the latter instance the flexible connections lack rigidity and confinement and may cause open or short circuits due to continued flexure or sag.

An object of the present invention is to provide an improved pigtail type of electrical connecting device which overcomes the disadvantages of existing connectors and, in addition, possesses the advantage of being, at all times, electrically isolated from adjacent devices.

Another object is to provide an improved cable reel for connecting and completing circuits between devices whose separation is variable.

Another object is to provide a construction wherein the operation of unwinding the cable from its drum and winding the same thereon is relatively noiseless and accomplished without danger of short circuits.

The above and other objects will appear more clearly from the following detailed description when taken in connection with the accompanying drawings which illustrate a preferred embodiment of the inventive idea; but it will be expressly understood that said drawings are employed merely to facilitate the description of the invention as a whole and not to define the limits thereof, reference being had to the appended claims for this purpose.

In the drawings:

Fig. 1 is a longitudinal section, partly in elevation, on the line 1—1 of Fig. 2, showing a cable drum and mounting therefor constructed in accordance with the invention;

Fig. 2 is a section on the line 2—2 of Fig. 1 looking in the direction of the arrow and showing the parts in the position when the cable is unwound from the drum;

Fig. 3 is a fragmentary elevation of a supporting structure for the cable drum, looking from the left end of Fig. 1;

Figure 4:
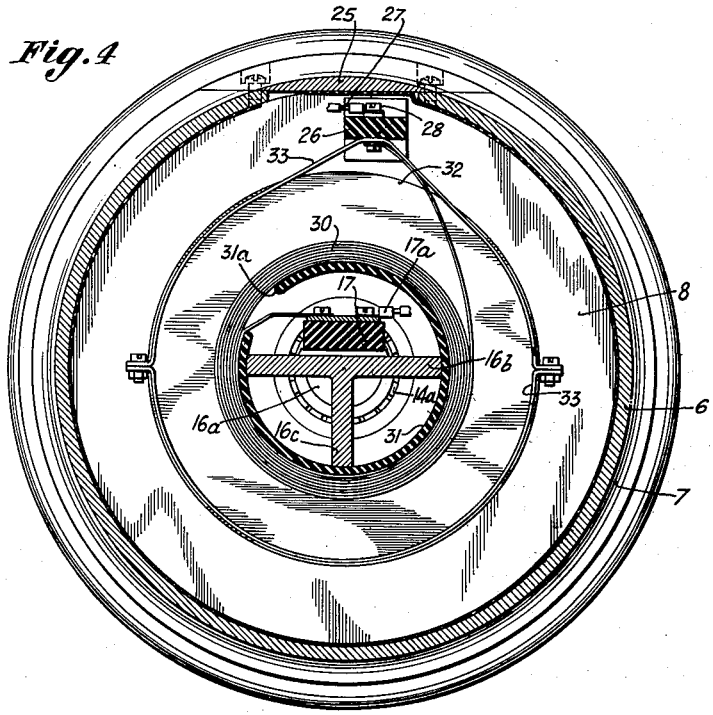
Fig. 4 is a section on the line 4—4 of Fig. 1.

The invention is designed for the purpose of electrically interconnecting two mechanisms whose separation may vary, and includes a cable drum for receiving an interconnecting cable which may be wound thereon and unwound therefrom, only so much of the cable being unwound as is required to effect the desired interconnection.

As shown in Fig. 1, the device comprises an outer rotatable drum 6 having a spiral groove 7 in its outer surface adapted to receive a multi-lead cable 7a when it is wound thereon. The major portion of the drum 6 is formed as an integral part of the left-hand apertured end plate 8, with the other end of said drum being closed by the removable apertured plate 9. A stationary mounting or supporting structure for the drum comprises a housing 10 having a removable cover 11 to afford access to the interior of the drum when making electrical connections therein from the multi-lead cable 18 which is supported by said cover when said connections are established. The housing 10 has formed thereon a stationary disc 12 opposed to the plate 9 and forming the end portion of a supporting structure that extends centrally through the drum 6. Said supporting structure comprises, in addition to the disc 12, a centrally located hub portion 16 formed on said disc and having an axially offset opening 15 therein through which the cable 18 is extended into the interior of the drum. Said drum is rotatable about the hub 16 and, for this purpose, a bearing 14 is interposed between the hub and the wall of the aperture in the plate 9, and a similar bearing 14a is mounted in the opening in the opposite end plate 8 of said drum and surrounds a trunnion 16a forming the left end of said supporting structure. Between the hub portion 16 and the trunnion 16a and formed integrally therewith is the medial section of said supporting structure which comprises the angularly disposed plates 16b and 16c shown in section in Fig. 4. The horizontal plate 16b provides a mounting for the stationary insulated terminal block 17 to which leads from the cable 18 are connected at 17a.

The closure plate 9 is recessed at 9a in its outer surface to receive a spirally wound guide strip 19 the convolutions of which are spaced and which, as shown in Fig. 2, has its outer end secured at 19a to the peripheral portion of the plate 9 while its inner extremity is fastened at 19b to an inner ring member 19c secured to the outer face of the plate 9. In Fig. 2, only the outer and inner extremities of the guide strip 19 are shown in full lines, the remainder thereof being indicated by dot and dash lines for simplification in illustration. The outer or peripheral portion of the plate 9 in the outer face thereof is recessed, as best shown in Fig. 2, to provide a detent 20 which acts as a stop, and a similar detent 21 is formed in the inner ring member 19c with its position reversed with respect to the detent 20. The arm 13 which acts as a locking member in limiting the rotation of the drum 6 in either direction, is countersunk in the inner face of the disc 12 and is pivoted at one end, with its free end provided with a laterally extending stud 22 which, in the unwound condition of the cable 7a on the drum, engages the stop 20, as shown in Fig. 2, and when said cable is completely wound upon the drum said stud will engage the stop 21 formed in the inner ring 19c, said stops thereby limiting the winding and unwinding movements of the drum and thus serving to prevent the cable from being wound too far upon the drum or from being strained against its fastening when it is unwound completely off the drum. Fig. 2 shows the position of the stud 22 when the cable 7a is completely unwound from the drum 6 and as the latter is rotated in a clockwise direction to wind said cable thereon the plate 9, rotating with said drum, will disengage the stop 20 from said stud 22 and the guide strip 19 rotating with the drum will receive said stud between the convolutions thereof and thereby progressively swing the arm 13 inwardly to the dotted line position of Fig. 3 until said stud is engaged by the stop 21, whereupon the cable will be completely wound upon the drum. In winding or unwinding, the number of revolutions permitted the drum is determined by the number of turns or convolutions in the spiral guide strip 19. A releasable clamp 23 (Fig. 2) is provided for securing the cable to the surface of the drum and a connecting plug 24 is secured to the free end of the cable to facilitate its connection to any desired mechanism.

As previously stated, the major portion of the drum 6 is formed as a part of the end plate 8. In order that access may be had to the interior of said drum through its peripheral portion, the latter is provided with a removable section 25 (Figs. 1 and 4). When said section is removed, the terminal block 26 is readily accessible for the purpose of connecting, to the terminals 28 thereof, the leads 27 of the cable 7a, and said block is fixed in position by screws 29 (Fig. 1) for rotation with the drum 6.

Electrical connection between the terminals 17a of the block 17 and the terminals 28 of the block 26 is made by means of flat coiled conductors 30. These conductors are each wound upon an insulating cylinder 31 secured to the edges of the plates 16a, 16b, with the inner end of the conductor electrically connected to its proper terminal 17a and then extended outwardly through a slot 31a in said cylinder upon which it is wound, with the outer end of the conductor connected to the terminal 28 corresponding to the terminal 17a on the block 26 which is rotatable with the drum. Each coiled conductor 30 is disposed between and restrained against lateral movement by an adjacent spaced pair of insulating discs 32 mounted on said cylinder. Each conductor thus provides a continuous interconnecting conducting path between leads in the cables 7a and 18, and the resistance of the conductor does not vary with the position of the cable drum so that no noise is introduced by its interposition as a circuit connection between said leads. In critical applications, a spiral or interleaved insulation between the coils of each conductor may be provided, or a complete covering of insulation may be desired for each conductor. The spiral winding of each conductor 30 about the stationary insulating cylinder 31 causes it to act somewhat like a coiled spring each time the cable 7a is unwound from or wound upon the drum 6. Such action of the conductor prevents kinking which is possible when employing a slack flexible conductor; and since the conductor 30 is not required to deliver torque and is protected from being wound too far by the limitation of the rotative movement of the drum by the stops 20 and 21 in cooperation with the stud 22, the conductor is actually never subject to any mechanical stress.

As shown in Fig. 4, each conductor 30 is compactly wound upon the cylinder 31, which is the position assumed by said conductor when the drum 6 has been rotated to unwind the cable 7a therefrom. As the cable is wound upon the drum by rotation of the latter in a manner to presently appear, the conductor 30 is unwound or extended in an outward direction between the confining discs 32. To prevent excessive expansion of the conductor beyond the confines of said discs with the resulting possibility of an accidental connection between adjacent conductors, a sectional restraining band 33 is extended about the outer open end of the channel formed by each pair of adjacent discs 32 and is fastened to the terminal block 26. The conductor is thus restricted to the space between adjacent discs and within the confines of the restraining band so that it will, at all times, be retained in an electrically isolated area.

Figure 5:
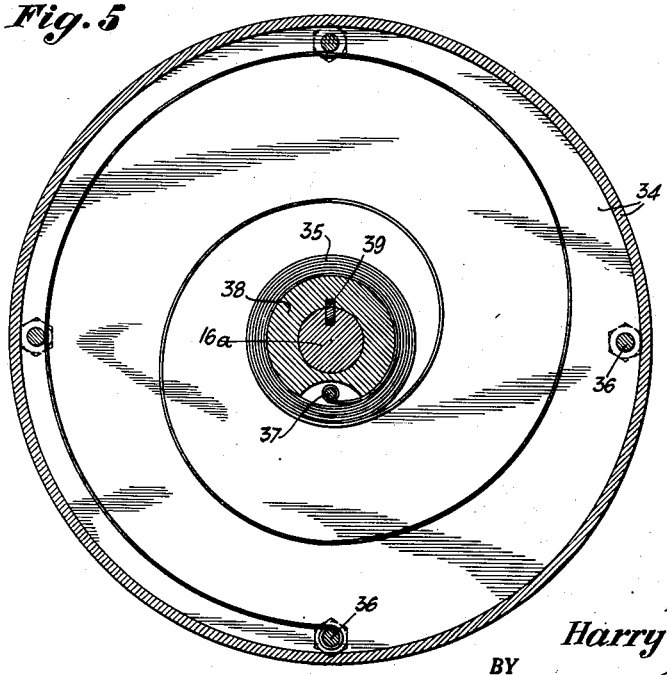
Fig. 5 is a section on the line 5—5 of Fig. 1.

At the end of the drum adjacent the plate 8, there is secured to said plate a housing 34 containing a spiral spring 35 which provides the motive power for rotating the drum 6 to wind the cable 7a thereon. As best shown in Fig. 5, said spring 35 is fastened at its outer end to one of the bolts 36 that secures the housing 34 in position, and is secured at its inner end, as at 37, to a sleeve 38 keyed at 39 to the outer extension of the fixed trunnion 16a. The spring may be fastened to any one of the bolts 36 and is thereby adjustable as to tension; and the spring is so arranged that, as the cable 7a is unwound from the drum, its tension will be progressively increased as it is coiled about the sleeve 38, thereby providing a turning force which will wind the cable upon the drum if said cable is not otherwise restrained as, for example, by connection of the plug 24 to some mechanism. By reason of this constant force tending to wind the cable upon the drum, the amount of unwound cable will always be maintained at a minimum since any surplusage thereof will be taken up under the influence of the spring.

What is claimed is:

1. In a reel for multi-lead cables, a rotatable drum for a cable, a stationary supporting structure for said drum upon which the latter is rotatable, said structure including angularly disposed plates, a terminal block mounted on one of said plates for connection to the leads of one cable, an insulating sleeve extending about and secured to the edges of said plates in encircling relation to said terminal block and having a longitudinal slot therein, a plurality of spaced insulating discs carried by said sleeve and forming conductor receiving channels therebetween, a second terminal block carried by said drum for connection to the leads of the first named cable, and spirally wound conducting elements each disposed in one of said channels and having its inner end secured to the first named terminal block and extending through said slot and its outer end secured to the second terminal block.

2. A cable reel including a rotatable drum, a supporting structure about which said drum rotates, terminal blocks carried by said drum and supporting structure for establishing electrical connections to a cable on said drum, an insulating sleeve slotted to receive conductors and mounted upon said supporting structure, spaced insulating elements arranged on said sleeve to form a conductor receiving channel, a conductor spirally wound upon said sleeve within said channel with its ends connected to said terminal blocks, and a restraining band for said conductor secured only to the terminal block carried by said drum and extending between said spaced insulating elements adjacent the peripheral portions thereof to encircle said conductor.

HARRY C. SCANLON.

REFERENCES CITED

The following references are of record in the file of this patent:

UNITED STATES PATENTS

| Number | Name | Date |
|---|---|---|
| 1,100,140 | Mayers | June 16, 1914 |
| 1,782,191 | Bolling | Nov. 18, 1930 |
| 1,958,626 | Krantz | May 15, 1934 |
| 2,374,457 | Reeves | Apr. 24, 1945 |

FOREIGN PATENTS

| Number | Country | Date |
|---|---|---|
| 23,641 of 1907 | Great Britain | Jan. 23, 1908 |
| 728,633 | France | Apr. 18 1932 |